United States Patent
Min et al.

(10) Patent No.: US 11,404,024 B2
(45) Date of Patent: Aug. 2, 2022

(54) SIGNAL ADJUSTING DEVICE, SIGNAL ADJUSTING METHOD, AND TEST EQUIPMENT

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Tae Yup Min, Beijing (CN); Zhi Zhang, Beijing (CN); Xiuzhu Tang, Beijing (CN); Shuai Chen, Beijing (CN); Taoliang Tang, Beijing (CN); Zhenguo Tian, Beijing (CN); Xuebo Liang, Beijing (CN); Shuang Hu, Beijing (CN); Lijun Xiong, Beijing (CN); Xing Dong, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 416 days.

(21) Appl. No.: 16/499,728

(22) PCT Filed: Mar. 29, 2019

(86) PCT No.: PCT/CN2019/080521
§ 371 (c)(1),
(2) Date: Sep. 30, 2019

(87) PCT Pub. No.: WO2019/196685
PCT Pub. Date: Oct. 17, 2019

(65) Prior Publication Data
US 2021/0366432 A1 Nov. 25, 2021

(30) Foreign Application Priority Data
Apr. 12, 2018 (CN) .......................... 201810327287.7

(51) Int. Cl.
*G09G 5/00* (2006.01)
*H04N 17/04* (2006.01)

(52) U.S. Cl.
CPC ........... *G09G 5/006* (2013.01); *H04N 17/045* (2013.01); *G09G 2310/0245* (2013.01); *G09G 2320/0247* (2013.01); *G09G 2330/12* (2013.01)

(58) Field of Classification Search
CPC ........... G09G 5/006; G09G 2310/0245; G09G 2320/0247; G09G 2330/12; H04N 17/045
(Continued)

(56) References Cited

U.S. PATENT DOCUMENTS 6,081,302 A 6/2000 Hanai
7,630,017 B2 12/2009 Yasuba et al.
(Continued)

FOREIGN PATENT DOCUMENTS

CN 1379597 A 11/2002
CN 101350557 A 1/2009
(Continued)

OTHER PUBLICATIONS

The Third Chinese Office Action dated Mar. 19, 2020; Appln. No. 201810327287.7.
(Continued)

*Primary Examiner* — Mark Edwards

(57) ABSTRACT

A signal adjusting device and method, and a test equipment. The signal adjusting device includes: a level controller, a level circuit, a comparison circuit and a selecting circuit. The level circuit is electrically connected with the selecting
(Continued)

circuit; the level controller is configured to perform a level adjustment to a first signal, so as to generate a level signal, and the generated level signal is outputted by the level circuit; the comparison circuit is configured to: determine that the level signal meets a preset condition, and generate and output a corresponding feedback signal to the selecting circuit, in response to determining that the level signal satisfies the preset condition; and the selecting circuit is configured to output, as an adjusted signal, the level signal corresponding to the feedback signal.

15 Claims, 4 Drawing Sheets

(58) Field of Classification Search
USPC .......................................................... 345/214
See application file for complete search history.

(56) References Cited

U.S. PATENT DOCUMENTS

| | | | |
|---|---|---|---|
| 2002/0149685 A1 | 10/2002 | Kobayashi et al. | |
| 2003/0098805 A1* | 5/2003 | Bizjak ..................... | H03G 7/002 341/139 |
| 2010/0118567 A1 | 5/2010 | Liu et al. | |
| 2012/0153846 A1 | 6/2012 | Li et al. | |
| 2015/0214971 A1 | 7/2015 | Kim | |
| 2016/0173815 A1 | 6/2016 | Yin et al. | |
| 2016/0226264 A1 | 8/2016 | Xu et al. | |
| 2016/0247471 A1 | 8/2016 | Zhang et al. | |

FOREIGN PATENT DOCUMENTS

| | | | |
|---|---|---|---|
| CN | 101751898 A | | 6/2010 |
| CN | 102201202 A | | 9/2011 |
| CN | 101795385 B | * | 4/2012 |
| CN | 101795385 B | | 4/2012 |
| CN | 104638722 A | | 5/2012 |
| CN | 103167262 A | | 6/2013 |
| CN | 104467424 A | | 3/2015 |
| CN | 104505034 A | | 4/2015 |
| CN | 104808540 A | | 7/2015 |
| CN | 104867475 A | | 8/2015 |
| CN | 107896311 A | | 4/2016 |
| CN | 108258706 A | | 7/2018 |

OTHER PUBLICATIONS

The First Chinese Office Action dated Jun. 18, 2019; Appln. No. 201810327287.7.
The Second Chinese Office Action dated Oct. 21, 2019; Appln. No. 201810327287.7.

* cited by examiner

SIGNAL ADJUSTING DEVICE, SIGNAL ADJUSTING METHOD, AND TEST EQUIPMENT

CROSS-REFERENCE TO RELATED APPLICATION

The present application claims priority to Chinese Patent Application No. 201810327287.7, filed on Apr. 12, 2018, the disclosure of which is incorporated herein by reference in its entirety as part of the present application.

TECHNICAL FIELD

The embodiments of the present disclosure relate to a signal adjusting device and a signal adjusting method, a test equipment.

BACKGROUND

In a display equipment, video signals are transmitted between a driving circuit and a display screen through video signal interfaces, and embedded video signal interfaces EDP (Embedded Display Port) are usually used. The matching condition between a video signal outputted by the driving circuit and a video signal received by the display screen is vitally important to the display effect. In case that the matching condition between a video signal outputted by the driving circuit and a video signal received by the display screen is so poor that the attenuation exceeds a certain threshold, an undesired phenomenon of screen flickering will appear, and the product quality is affected.

SUMMARY

At least one embodiment of the present disclosure provides a signal adjusting device, comprising: a level controller, a level circuit, a comparison circuit, and a selecting circuit;
wherein the level circuit is electrically connected with the selecting circuit;
the level controller is electrically connected with the comparison circuit through the level circuit, and is configured to perform a level adjustment to a first signal, so as to generate a level signal, and the generated level signal is outputted by the level circuit;
the comparison circuit is electrically connected to the selecting circuit, and is configured to:
  determine that the level signal meets a preset condition, and
  generate and output a corresponding feedback signal to the selecting circuit, in response to determining that the level signal satisfies the preset condition; and
the selecting circuit is configured to output, as an adjusted signal, the level signal corresponding to the feedback signal.

For example, the signal adjusting device according to at least one embodiment of the present disclosure further comprises a first sampling circuit,
wherein the first sampling circuit is electrically connected to the level controller, and is configured to acquire and output the first signal.

For example, in the signal adjusting device according to at least one embodiment of the present disclosure, the selecting circuit comprises a switch controller and a switch circuit;
the level circuit is electrically connected with the switch circuit;
the comparison circuit is electrically connected with the switch controller, and is configured to output the feedback signal to the switch controller; and
the switch controller is electrically connected to the switch circuit, and is configured to turn on the switch circuit corresponding to the feedback signal, so as to output, as the adjusted signal, the level signal corresponding to the feedback signal.

For example, in the signal adjusting device according to at least one embodiment of the present disclosure, the signal adjusting device comprises five level circuits, and the five level circuits are in the level controller, and
the selecting circuit comprises five switch circuits, and the five switch circuits are in the switch controller.

For example, in the signal adjusting device according to at least one embodiment of the present disclosure, the comparison circuit comprises a first comparator,
the first comparator is electrically connected to the level circuit and the switch controller, and the first comparator is configured to:
  determine a primary difference between the level signal and a preset reference signal;
  determine that the primary difference is greater than a first preset threshold; and
  generate and output the corresponding feedback signal in response to determining that the primary difference is greater than the first preset threshold.

For example, in the signal adjusting device according to at least one embodiment of the present disclosure, the comparison circuit comprises a first comparator and a second comparator,
the first comparator is electrically connected with the level circuit; the first comparator is electrically connected with the second comparator; the second comparator is also electrically connected with the switch controller,
the first comparator is configured to:
  determine a primary difference between the level signal and a preset reference signal;
  determine the primary difference is greater than the first preset threshold; and
  output, as a primary feedback signal, the level signal corresponding to the primary difference, in response to determining that the primary difference is greater than the first preset threshold, and
the second comparator is configured to:
  determine a secondary difference between a second signal and the primary feedback signal; and
  generate and output the corresponding feedback signal to the switch controller, based on the secondary difference.

For example, in the signal adjusting device according to at least one embodiment of the present disclosure, the second comparator is further configured to:
  determine that the secondary difference is less than or equal to a second preset threshold; and
  generate, as the feedback signal, a secondary feedback signal corresponding to the secondary difference, in response to determining that the secondary difference is less than or equal to the second preset threshold.

For example, in the signal adjusting device according to at least one embodiment of the present disclosure, the second comparator is further configured to:
  determine a minimum value of the secondary difference, and
  generate a corresponding secondary feedback signal as the feedback signal, based on the minimum value of the secondary difference.

For example, in the signal adjusting device according to at least one embodiment of the present disclosure, the first comparator is electrically connected to at least two level circuits.

For example, the signal adjusting device according to at least one embodiment of the present disclosure further comprises a second sampling circuit, wherein the second sampling circuit is configured to acquire and output the second signal, and the second sampling circuit is electrically connected to the second comparator.

For example, the signal adjusting device according to at least one embodiment of the present disclosure further comprises a reset circuit, wherein the reset circuit is electrically connected with the level controller, and is configured to generate a reset signal to reset the adjusted signal, in a case where the reset circuit receives an adjustment instruction for an adjustment and output cycle of the adjusted signal.

For example, in the signal adjusting device according to at least one embodiment of the present disclosure, the first signal and the second signal are both video signals.

At least one embodiment of the present disclosure further provides a signal adjusting method, which comprises:

performing a level adjustment to an acquired first signal, to generate a level signal;

determining that the level signal satisfies a preset condition, and generating a corresponding feedback signal in response to determining that the level signal satisfies the preset condition; and outputting, as an adjusted signal, the level signal corresponding to the feedback signal.

For example, in the signal adjusting method according to at least one embodiment of the present disclosure, the determining that the level signal satisfies the preset condition, and generating the corresponding feedback signal in response to determining that the level signal satisfies the preset condition comprises:

determining a primary difference between the level signal and a preset reference signal;

determining that the primary difference is greater than a first preset threshold; and generating the corresponding feedback signal in response to determining that the primary difference is greater than the first preset threshold.

For example, in the signal adjusting method according to at least one embodiment of the present disclosure, the determining that the level signal satisfies the preset condition, and generating the corresponding feedback signal in response to determining that the level signal satisfies the preset condition comprises:

determining a primary difference between the level signal and a preset reference signal;

determining that the primary difference is greater than a first preset threshold;

using the level signal corresponding to the primary difference as a primary feedback signal, in response to determining that the primary difference is greater than the first preset threshold;

determining a secondary difference between the primary feedback signal and an acquired second signal; and generating the corresponding feedback signal based on the secondary difference.

For example, in the signal adjusting method according to at least one embodiment of the present disclosure, the generating the corresponding feedback signal based on the secondary difference comprises:

determining that the secondary difference is less than or equal to a second preset threshold; and generating, as the feedback signal, a secondary feedback signal corresponding to the secondary difference, in response to determining that the secondary difference is less than or equal to the second preset threshold.

For example, in the signal adjusting method according to at least one embodiment of the present disclosure, the generating the corresponding feedback signal based on the secondary difference comprises:

determining a minimum value of the secondary difference; and generating, as the feedback signal, a corresponding secondary feedback signal based on the minimum value of the secondary difference.

For example, the signal adjusting method according to at least one embodiment of the present disclosure further comprises:

generating a reset signal to reset the adjusted signal, in a case where an adjustment instruction for adjustment and output cycle of the adjusted signal is received.

For example, in the signal adjusting method according to at least one embodiment of the present disclosure, the first signal and the second signal are both video signals.

At least one embodiment of the present disclosure further provides a test equipment, which comprises:

a display screen;

a driving circuit, configured to drive the display screen; and the signal adjusting device according to any of the claims 1 to 12, wherein the signal adjusting device is configured to acquire the first signal from the driving circuit, and to output the adjusted signal to the display screen.

For example, in the test equipment according to at least one embodiment of the present disclosure, the first signal is sampled from a signal output port of the driving circuit.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

When video signals of a driving circuit are transmitted to a display screen, the video signals often suffer from different degrees of attenuation, and when the attenuation exceeds a certain threshold, it will lead to poor signal matching, and then will lead to the occurrence of a screen flickering phenomenon.

Figure 1:
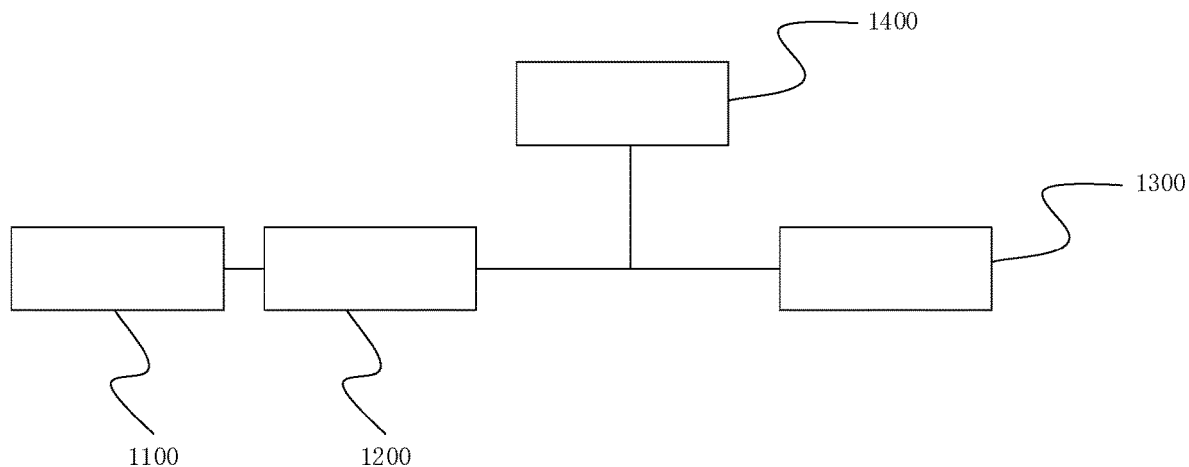
FIG. 1 is a schematic block diagram illustrating a signal adjusting device provided by at least some embodiments of the present disclosure.

At least some embodiments of the present disclosure provide a signal adjusting device, which can be used to reduce the attenuation of a signal during transmission. As shown in FIG. 1, the signal adjusting device 1000 according to at least some embodiments of the present disclosure may include a level controller 1100, a level circuit 1200, a comparison circuit 1300, and a selecting circuit 1400.

The level circuit 1200 is electrically connected with the selecting circuit 1400.

The level controller 1100 is electrically connected with the comparison circuit 1300 through the level circuit 1200, and is configured to perform a level adjustment to a first signal, so as to generate a level signal, and the generated level signal is outputted by the level circuit 1200.

The comparison circuit 1300 is electrically connected with the selecting circuit 1400, and is configured to determine that the level signal satisfies a preset condition, and to generate and output a corresponding feedback signal to the selecting circuit 1400, in response to determining that the level signal satisfies the preset condition.

The selecting circuit 1400 is configured to output, as an adjusted signal, the level signal corresponding to the feedback signal.

It should be understood that, the signal adjusting device according to at least some embodiments of the present disclosure may be used to adjust various signals, including, but not limited to, video signals, and the embodiments of the present disclosure have no limitation in this aspect.

Figure 2:
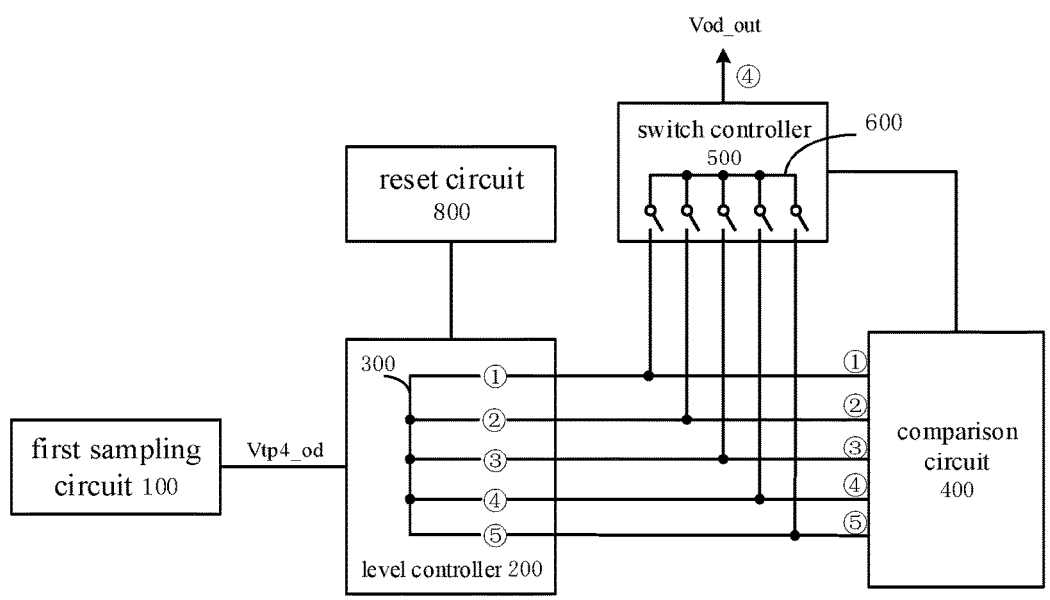
FIG. 2 is a schematic structural diagram illustrating a signal adjusting device provided by at least some embodiments of the present disclosure.

FIG. 2 is a schematic structural diagram illustrating a signal adjusting device provided by at least some embodiments of the present disclosure. As shown in FIG. 2, the device includes a first sampling circuit 100, a level controller 200, at least one level circuit 300, a comparison circuit 400, a switch controller 500 and at least one switch circuit 600.

The first sampling circuit 100 is electrically connected with the level controller 200; the level controller 200 is electrically connected with the at least one level circuit 300; the at least one level circuit 300 is connected with the comparison circuit 400, and is electrically connected with the at least one switch circuit 600, respectively; the comparison circuit 400 is electrically connected with the switch controller 500; and the switch controller 500 is electrically connected to the at least one switch circuit 600.

It should be understood that, in some embodiments, the signal adjusting device may not include the first sampling circuit 100, and a first signal is provided to the signal adjusting device by other circuits. The embodiments of the present disclosure have no limitation in this aspect.

The working principle of the signal adjusting device provided by an embodiment of the present disclosure is as follows.

The first sampling circuit 100 acquires a first signal $Vtp4\_od$ at a first sampling point, and outputs the first signal $Vtp4\_od$ to the level controller 200. The first sampling point is an EDP interface of a driving circuit, and may be represented by TP4.

The level controller 200 performs at least one level adjustment to the first signal $Vtp4\_od$, so as to generate at least one level signal, and outputs the at least one level signal to the comparison circuit 400 through at least one level circuit 300.

The comparison circuit 400 determines whether the level signal generated by the level controller 200 meets a preset condition, and in a case where the preset condition is met, a corresponding feedback signal is generated and outputted to the switch controller 500.

The switch controller 500 allows a switch circuit 600 corresponding to the feedback signal to be turned on, and outputs, as an adjusted signal $Vod\_out$, the level signal corresponding to the feedback signal. The switch controller 500 and the switch circuit 600 are used as an example of the above selecting circuit, but it should be understood that the embodiments of the present disclosure have no limitation in this aspect.

Upon application of an embodiment of the present disclosure, the level adjustment to the first signal $Vtp4\_od$ can be realized by the level controller 200 and the level circuit 300, so as to reduce attenuation of the first signal; and a signal $Vod\_out$ meeting certain requirements is selected by the comparison circuit 400.

The embodiments of the present disclosure do not limit the setting manner of the level circuit 300 and the switch circuit 600. The level circuit 300 may be separately provided or may be integrated with the level controller 200, and the switch circuit 600 may be separately provided or may be integrated with the switch controller 500. Users can make a flexible setting according to actual requirements.

In an exemplary embodiment, by adopting such a manner that a level circuit 300 is integrated with a level controller 200 and a switch circuit 600 is integrated with a switch controller 500, it is possible to improve the integration degree of circuits, reduce the volume of circuits, and save the space resource.

In an exemplary embodiment, the at least one level circuit 300 includes five level circuits, and the five level circuits 300 are all arranged in the level controller 200. Correspondingly, the at least one switch circuit 600 includes five switch circuits, and the five switch circuits 600 are all arranged in the switch controller 500. Exemplarily, the five level circuits 300 correspond to a first pre-emphasis level, a pre-emphasis & swing level, a first swing level, a second pre-emphasis level and a second swing level, respectively.

According to the embodiments of the present disclosure, the first signal Vtp4_od is adjusted based on the above-mentioned five levels, so that the signal strength and the signal climbing rate of the first signal Vtp4_od can be increased and the signal attenuation is reduced.

In the process of performing at least one level adjustment to a signal according to an embodiment of the present disclosure, automatic selection and shifting of levels can be realized. Thus, manual selection and shifting are avoided, and the efficiency of level adjustment is improved.

Figure 3:
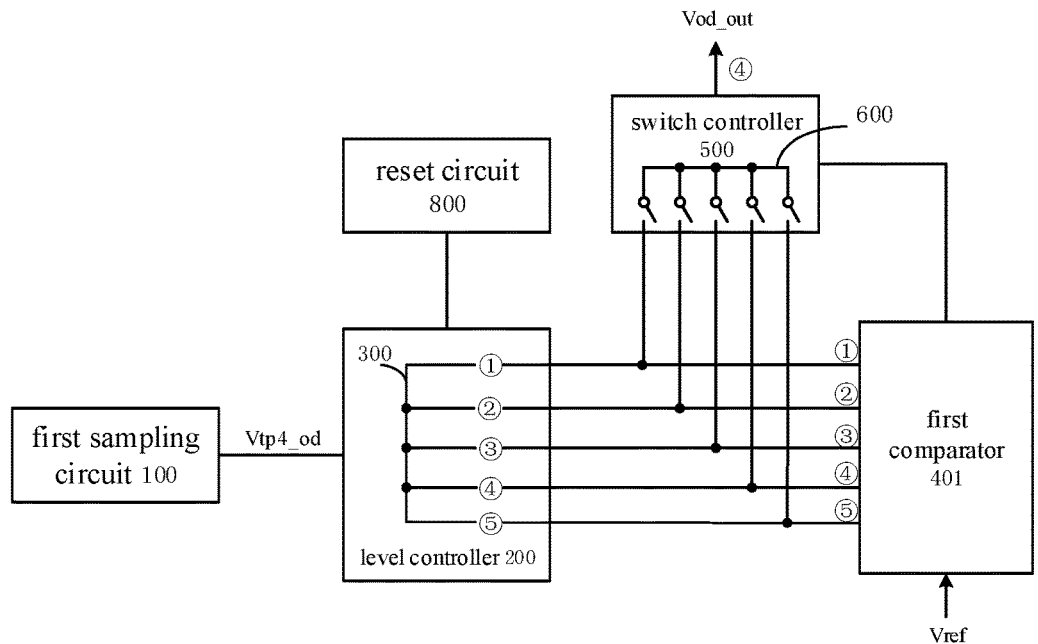
FIG. 3 is a schematic structural diagram illustrating an example of the signal adjusting device shown in FIG. 2.

Referring to FIG. 3, in an exemplary embodiment, the above-mentioned comparison circuit 400 is implemented by a first comparator 401 specifically, which is used as the reference comparator and determines a primary difference between each level signal and a preset reference signal Vref, determines whether the determined primary difference is greater than a first preset threshold, and if yes, generates a corresponding feedback signal and outputs it to a switch controller 500. Further, the reference signal Vref may be 120 mv (millivolt) specifically.

The reference signal Vref in the embodiments of the present disclosure is usually determined according to such an industry standard that the matching requirement can be met, and correspondingly, the first preset threshold is also set according to the industry standard. If the primary difference is greater than the first preset threshold, then a corresponding level signal can meet the industry standard, and therefore, the matching degree between a signal outputted by the adjusting device in the embodiments of the present disclosure and a signal outputted by the display screen is relatively high.

Figure 4:
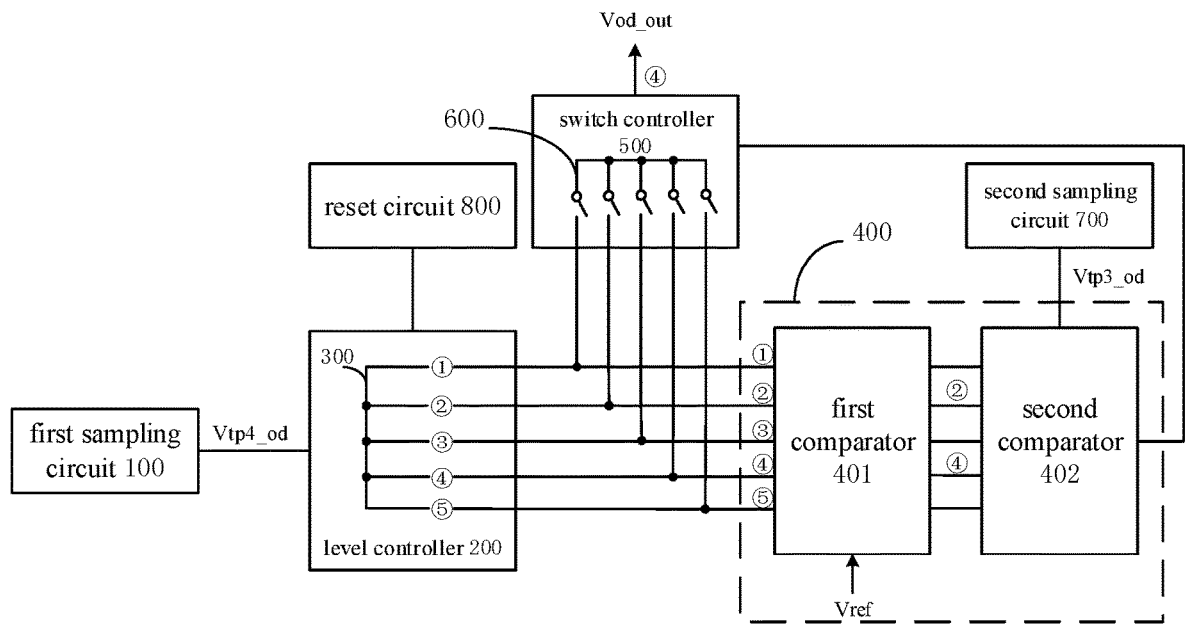
FIG. 4 is a schematic structural diagram illustrating another example of the signal adjusting device shown in FIG. 2.

In an exemplary embodiment, referring to FIG. 4, the above-mentioned signal adjusting device further includes a second sampling circuit 700, and the above-mentioned comparison circuit 400 specifically includes a first comparator 401 and a second comparator 402. The first comparator 401 is electrically connected to at least two level circuits 300; the first comparator 401 and the second sampling circuit 700 each are electrically connected to the second comparator 402; and the second comparator 402 is also electrically connected to the switch controller 500.

It should be understood that, in some embodiments, the signal adjusting device may not include the second sampling circuit 700, and a second signal may be provided to the signal adjusting device by other circuits. The embodiments of the present disclosure have no limitation in this aspect.

The working principle of the second sampling circuit 700, the first comparator 401 and the second comparator 402 is as follows.

The second sampling circuit 700 acquires a second signal Vtp3_od from a second sampling point at a signal receiving terminal of the display panel, and outputs the second signal Vtp3_od to the second comparator 402; the second sampling point is an EDP interface of the display screen, and may be represented by TP3.

The first comparator determines a primary difference between each level signal and a preset reference signal Vref, determines whether the determined primary difference is greater than a first preset threshold, and if yes, uses a level signal corresponding to the primary difference as a primary feedback signal, and outputs the primary feedback signal to the second comparator 402.

The second comparator 402 determines a secondary difference between a second signal Vtp3_od obtained and outputted by the second sampling circuit 700 and each primary feedback signal, generates a corresponding feedback signal based on the secondary difference and outputs the feedback signal to the switch controller 500.

Exemplarily, in an embodiment, the second comparator 402 determines the secondary difference between the second signal Vtp3_od and each primary feedback signal, and determines the minimum secondary difference. The second comparator 402 generates a corresponding secondary feedback signal based on the minimum secondary difference, and outputs the secondary feedback signal to the switch controller 500 as the final feedback signal.

In this embodiment, the second comparator 402 may determine a primary feedback signal with the minimum attenuation relative to the second signal Vtp3_od by use of its comparison function, and further, the adjusted first signal Vtp4_od can be made to have a minimum degree of attenuation relative to the second signal Vtp3_od. Correspondingly, the signal matching condition between the driving circuit and the display screen reaches the optimum, and a screen flickering phenomenon caused by signal attenuation is reduced.

Exemplarily, in another embodiment, the second comparator 402 may also be used to: determine a secondary difference between the second signal Vtp3_od and each primary feedback signal; determine whether the determined secondary difference is greater than a second preset threshold, which may be set by the user according to the actual requirements; generate a corresponding secondary feedback signal based on the secondary difference, and output the secondary feedback signal to the switch controller 500 as a feedback signal, if the secondary difference is not greater than the second preset threshold.

In this embodiment, the second comparator 402 may determine a primary feedback signal meeting the user's requirements by use of its comparison function, and further make the attenuation of the adjusted first signal Vtp4_od relative to the second signal Vtp3_od to meet the user's actual requirements. In addition, the second preset threshold may be set by the user according to the actual requirements, so that the flexibility of signal adjustment is increased, and the signal adjustment and the final display effect are more in line with the user's requirements.

In an exemplary embodiment, the adjusting device provided by an embodiment of the present disclosure further includes a reset circuit 800. The reset circuit 800 is electrically connected with the level controller 200, and is configured to receive an adjustment instruction for an adjustment and output cycle of the signal, and generate a reset signal based on the adjustment instruction to reset the adjusted signal, so that the signal adjusting device returns to an initial state to prepare for the adjustment and output of the next cycle. For example, after the adjustment of one cycle is made to the first signal Vtp4_od and the adjusted signal Vod_out is outputted, an adjustment instruction for adjusting the adjustment and output cycle is generated and transmitted to the reset circuit 800, thereby resetting the adjusted signal Vod_out by the reset circuit 800; or, when it is not possible to output a level signal satisfying a preset condition, an adjustment instruction for adjusting the adjustment and output cycle is generated and transmitted to the reset circuit 800, so that the level controller 200 is reset by the reset circuit 800 and goes into a new cycle of adjustment.

By taking the circuit diagram shown in FIG. 3 as an example, the working principle of an exemplary adjusting device will be further explained below.

The first sampling circuit 100 acquires a first signal Vtp4_od and outputs the first signal Vtp4_od to the level controller 200, and the level controller 200 controls level circuits 300 (such as the circuits to which serial numbers ① to ⑤ correspond in FIG. 3) to adjust the Vtp4_od in turn, so that level signals ① to ⑤ are obtained and outputted to the first comparator 401.

The first comparator 401 compares the level signals ① to ⑤ with a preset reference signal Vref (e.g. 120 mv), so as to determine differences between the level signals and Vref. By comparison, a difference between the level signal ④ and the Vref is greater than a first preset threshold, and so a feedback signal corresponding to the difference is outputted to the switch controller 500.

According to the feedback signal, the switch controller 500 turns on a level circuit 300, to which the serial number ④ corresponds, and outputs the level signal ④ corresponding to the level circuit 300 as Vod_out, thereby accomplishing the whole process of signal adjustment. The reset circuit 800 resets the level controller 200 after receiving an adjustment instruction, so as to go into an operation of next cycle.

By taking the circuit diagram shown in FIG. 4 as an example, the working principle of another exemplary adjusting device will be further explained below.

The first sampling circuit 100 acquires a first signal Vtp4_od and outputs the first signal Vtp4_od to the level controller 200, and the level controller 200 controls the level circuits 300 (such as the circuits to which serial numbers ① to ⑤ correspond in FIG. 4) to adjust the Vtp4_od in turn, so that level signals ① to ⑤ are obtained and outputted to the first comparator 401.

The first comparator 401 compares the level signals ① to ⑤ with a preset reference signal Vref (e.g. 120 mv), so as to determine primary differences between the level signals and the Vref. By comparison, the primary differences between the level signals ② and ④ and the Vref are greater than a first preset threshold, and so the level signals ② and ④ corresponding to the two primary differences are outputted to a second comparator 402.

The second comparator 402 compares a second signal Vtp3_od acquired by a second sampling circuit 700 with the level signals ② and ④, so as to determine secondary differences between the two level signals and Vtp3_od, and the second comparator 402 compares the two secondary differences. By comparison, the secondary difference corresponding to the level signal ④ is the smallest, and so a corresponding feedback signal is generated based on the secondary difference and outputted to a switch controller 500.

The switch controller 500 turns on the level circuit 300 to which the serial number ④ corresponds, and outputs a level signal ④ corresponding to the level circuit 300 as Vod_out, thereby accomplishing the whole process of signal adjustment. The reset circuit 800 resets the level controller 200 after receiving an adjustment instruction, so as to go into the operation of the next cycle.

The signal adjusting device according to at least some embodiments of the present disclosure has at least the following beneficial effects:

1) With use of the level circuit and the level controller, a first signal received by the display screen may be adjusted, and the first signal may be compared and filtered by the comparison circuit, so that attenuation of the adjusted signal meets the requirements, poor signal matching condition caused by the signal attenuation and the screen flickering phenomenon are improved, and the display effect is more in line with the user's requirements;

2) The first signal may be compared and filtered twice by the first comparator and the second comparator, so that attenuation of the adjusted signal is minimized, poor signal matching condition caused by the signal attenuation and the screen flickering phenomenon are improved, and the display effect is optimized to the greatest extent on the basis of meeting the user's requirements;

3) Based on an idea of active adjustment, active adjustment and automatic adjustment of the first signal may be realized, manual operation is not required, and the efficiency of signal adjustment is greatly improved.

4) The adjustment cycle of the signal may be controlled by a reset circuit, and the automation of adjustment is further improved.

It should be understood that, all of the first signals, the second signals, and the adjusted signals as mentioned above may be video signals, and the embodiments of the present disclosure have no limitation in this aspect.

Figure 5:
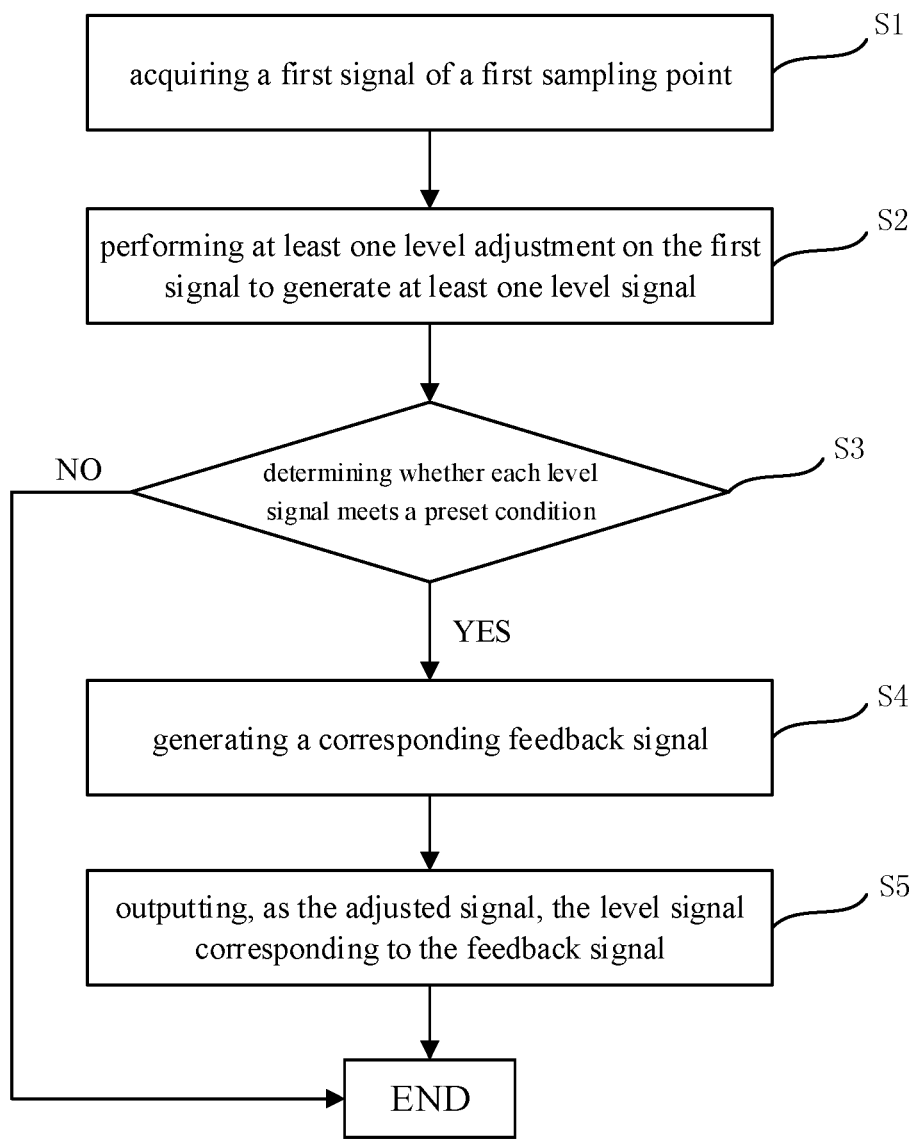
FIG. 5 is a schematic flowchart illustrating a signal adjusting method provided by at least some embodiments of the present disclosure.

At least some embodiments of the present disclosure further provide a signal adjusting method. The schematic flowchart of the method, as shown in FIG. 5, includes:

S1, acquiring a first signal of a first sampling point.

The first sampling point is a sampling point at the output of a driving circuit, and may be represented by TP4; and the acquired first signal Vtp4_od is a signal outputted by the driving circuit.

S2, performing at least one level adjustment on the first signal to generate at least one level signal.

In an exemplary embodiment, five level adjustments are performed on the first signal, and the involved five level circuits 300 are a first pre-emphasis level, a pre-emphasis & swing level, a first swing level, a second pre-emphasis level and a second swing level, respectively. Depending on the user's requirements, it is also possible to select any of the provided five level circuits 300 to perform the level adjustment.

S3, determining whether each level signal meets a preset condition, if yes, then S4 is performed; otherwise, stopping outputting signals, and the whole process of signal adjustment ends.

Exemplarily, the preset condition include the following two cases: 1) the difference between a level signal and a preset reference signal Vref is greater than a first preset threshold; 2) the difference between a level signal and the preset reference signal Vref is greater than the first preset threshold, and the difference between the level signal and the acquired second signal Vtp3_od is less than a second preset threshold or is the minimum.

Exemplarily, in a case where the preset condition is the first case, a primary difference between each level signal and the preset reference signal Vref is determined, it is determined whether the determined primary difference is greater than the first preset threshold, and if yes, S4 is executed.

Exemplarily, in a case where the preset condition is the second case, a primary difference between each level signal and the preset reference signal Vref is determined, it is determined whether the determined primary difference is greater than the first preset threshold, and if yes, the level signal corresponding to the primary difference is used as a primary feedback signal; and a secondary difference between the second signal Vtp3_od and each primary feedback signal is determined, it is determined whether the determined secondary difference is greater than the second preset threshold, and if the secondary difference is not greater than the second preset threshold, then S4 is executed.

S4, generating a corresponding feedback signal.

Exemplarily, in a case where the preset condition in S3 is the first case, in this step, based on the primary difference greater than the first preset threshold, a corresponding feedback signal is generated and outputted to the switch controller 500.

Exemplarily, in a case where the preset condition in S3 is the second case, in this step, a corresponding secondary feedback signal is generated based on the smallest secondary difference to be used as a feedback signal; or, a corresponding secondary feedback signal is generated based on a secondary difference not greater than the second preset threshold, and the secondary feedback signal is taken as the feedback signal.

S5, outputting, as the adjusted signal, the level signal corresponding to the feedback signal.

Specifically, for the corresponding feedback signal generated in S4, in this step, a switch circuit 600 corresponding to the feedback signal is turned on, and the level signal corresponding to the feedback signal can be outputted by the switch circuit 600.

Exemplarily, the signal adjustment provided by an embodiment of the present disclosure may be used for the adjustment and output of a signal for at least one cycle, and the adjustment process of each cycle includes the above-mentioned steps S1 to S5, thereby improving the continuity and automation level of the signal adjustment.

In an exemplary embodiment, an embodiment of the present disclosure further includes: generating a reset signal in response to receiving an adjustment instruction for the adjustment and output cycle of a signal, to reset the adjusted signal, so that the signal adjusting device returns to an initial state and prepares for the adjustment and output of the next cycle. For example, after the first signal Vtp4_$od$ undergoes adjustment of one cycle and the adjusted signal Vod_out is outputted, the adjusted signal Vod_out is reset by a reset circuit 800; or, in the case where a level signal satisfying a preset condition cannot be outputted, the adjusted signal Vod_out is reset by the reset circuit 800.

For the contents not mentioned in description of the signal adjusting method according to at least some embodiments of the present disclosure, reference may be made to the above description pertaining to the signal adjusting device. The beneficial effects that can be achieved by the signal adjusting method according to at least some embodiments of the present disclosure are the same as those of the signal adjusting device according to at least some embodiments of the present disclosure, which will not be repeated herein.

Figure 6:
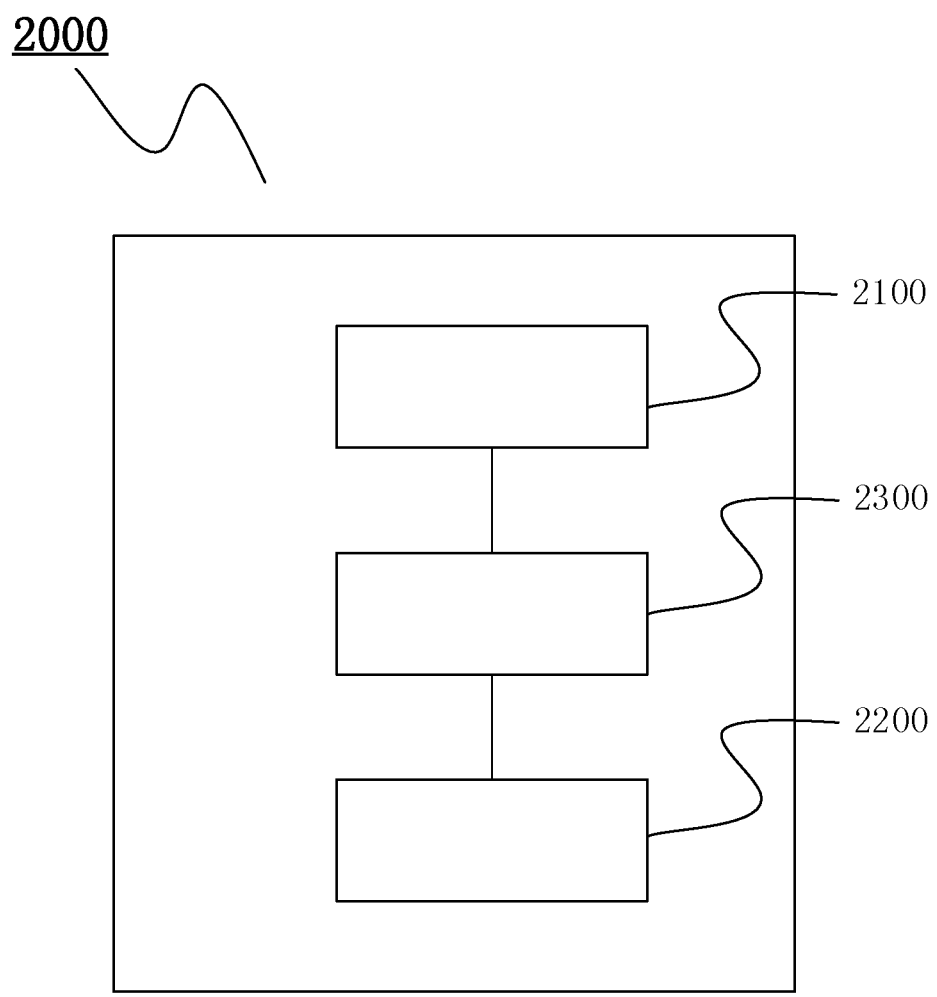
FIG. 6 is a schematic block diagram illustrating a test equipment provided by at least some embodiments of the present disclosure.

At least some embodiments of the present disclosure provide a test equipment. As shown in FIG. 6, the test equipment 2000 according to at least some embodiments of the present disclosure includes:

a display screen 2100;

a drive circuit 2200, configured to drive the display screen 2100; and a signal adjusting device 2300, wherein the signal adjusting device 2300 is configured to acquire a first signal from the driving circuit 2200, and to output an adjusted signal to the display screen 2100. The signal adjusting device 2300 may be the signal adjusting device according to any of the above embodiments.

In some embodiments, the first signal is sampled from a signal output port of the drive circuit 2200, and the second signal is sampled from a signal input port of the display screen 2100.

It should be understood by those skilled in the art that, each frame in these structural diagrams and/or block diagrams and/or flowcharts, as well as the combination of frames in these structural diagrams and/or block diagrams and/or flowcharts, can be implemented with computer program instructions. It should be understood by those skilled in the art that, these computer program instructions can be provided to a general-purpose computer, a professional computer or a processor with other programmable data processing methods for implementation, so as to execute the scheme specified in a frame or multiple frames of the structural diagram and/or block diagram and/or flowchart disclosed by the present disclosure, by means of the computer or the processor with other programmable data processing methods.

It should be understood by those skilled in the art that, steps, measures and schemes in various operations, methods and procedures that have been discussed in this disclosure can be alternated, modified, combined or deleted. Further, other steps, measures and schemes with the various operations, methods, and procedures that have been discussed in this disclosure can also be alternated, modified, rearranged, decomposed, combined, or deleted.

The foregoing merely are exemplary embodiments of the disclosure, and not intended to define the scope of the disclosure, and the scope of the disclosure is determined by the appended claims.

What is claimed is:

1. A signal adjusting device comprising: a level controller, at least one level circuit, a comparison circuit, and a selecting circuit;

wherein the at least one level circuit is electrically connected with the selecting circuit;

the level controller is electrically connected with the comparison circuit through the at least one level circuit, and is configured to perform a level adjustment to a first signal, so as to generate at least one level signal, and the generated at least one level signal is outputted by the at least one level circuit;

the comparison circuit is electrically connected to the selecting circuit, and is configured to:

compare the at least one level signal with a preset reference signal to obtain a comparison result; and generate and output a corresponding feedback signal to the selecting circuit, based on the comparison result; and the selecting circuit is configured to output, as an adjusted signal, the level signal corresponding to the feedback signal;

the selecting circuit comprises a switch controller and a switch circuit;

the at least one level circuit is electrically connected with the switch circuit;

the comparison circuit is electrically connected with the switch controller, and is configured to output the feedback signal to the switch controller; and the switch controller is electrically connected to the switch circuit, and is configured to turn on the switch circuit corresponding to the feedback signal, so as to output, as the adjusted signal, the level signal corresponding to the feedback signal;

the comparison circuit comprises a first comparator and a second comparator, the first comparator is electrically connected with the at least one level circuit; the first comparator is electrically connected with the second comparator; the second comparator is electrically connected with the switch controller, the first comparator is configured to:
determine a primary difference between the level signal and the preset reference signal;
determine the primary difference is greater than the first preset threshold; and
output, as a primary feedback signal, the level signal corresponding to the primary difference, in response to determining that the primary difference is greater than the first preset threshold, and the second comparator is configured to:
determine a secondary difference between a second signal and the primary feedback signal; and
generate and output the corresponding feedback signal to the switch controller, based on the secondary difference.

2. The device according to claim 1, further comprising a first sampling circuit,
wherein the first sampling circuit is electrically connected to the level controller, and is configured to acquire and output the first signal.

3. The device according to claim 1, wherein
the at least one level circuit comprises five level circuits, and the five level circuits are in the level controller, and
the selecting circuit comprises five switch circuits, and the five switch circuits are in the switch controller.

4. The device according to claim 1, wherein the second comparator is further configured to:
determine that the secondary difference is less than or equal to a second preset threshold; and
generate, as the feedback signal, a secondary feedback signal corresponding to the secondary difference, in response to determining that the secondary difference is less than or equal to the second preset threshold.

5. The device, according to claim 1, wherein the second comparator is further configured to:
determine a minimum value of the secondary difference, and
generate a corresponding secondary feedback signal as the feedback signal, based on the minimum value of the secondary difference.

6. The device according to claim 1, wherein
the at least one level circuit comprises a plurality of level circuits, and
the first comparator is electrically connected to at least two of the plurality of level circuits.

7. The device according to claim 1, further comprising a second sampling circuit,
wherein the second sampling circuit is configured to acquire and output the second signal, and
the second sampling circuit is electrically connected to the second comparator.

8. The device according to claim 1, further comprising a reset circuit,
wherein the reset circuit is electrically connected with the level controller, and is configured to generate a reset signal to reset the adjusted signal, in a case where the reset circuit receives an adjustment instruction for an adjustment and output cycle of the adjusted signal.

9. The device according to claim 1, wherein the first signal and the second signal are both video signals.

10. A signal adjusting method comprising:
performing a level adjustment to an acquired first signal, to generate at least one level signal;
comparing the at least one level signal with a preset reference signal to obtain a comparison result, and generating a corresponding feedback signal, based on the comparison result; and
outputting, as an adjusted signal, the level signal corresponding to the feedback signal;
wherein the comparing the at least one level signal with the preset reference signal to obtain the comparison result, and generating the corresponding feedback signal, based on the comparison result comprises:
determining a primary difference between the at least one level signal and the preset reference signal;
determining that the primary difference is greater than a first preset threshold;
using the at least one level signal corresponding to the primary difference as a primary feedback signal, in response to determining that the primary difference is greater than the first preset threshold;
determining a secondary difference between the primary feedback signal and an acquired second signal; and
generating the corresponding feedback signal based on the secondary difference.

11. The method according to claim 10, wherein the generating the corresponding feedback signal based on the secondary difference comprises:
determining that the secondary difference is less than or equal to a second preset threshold; and
generating, as the feedback signal, a secondary feedback signal corresponding to the secondary difference, in response to determining that the secondary difference is less than or equal to the second preset threshold.

12. The method according to claim 10, wherein the generating the corresponding feedback signal based on the secondary difference comprises:
determining a minimum value of the secondary difference; and
generating, as the feedback signal, a corresponding secondary feedback signal based on the minimum value of the secondary difference.

13. The method according to claim 10, further comprising:
generating a reset signal to reset the adjusted signal, in a case where an adjustment instruction for adjustment and output cycle of the adjusted signal is received.

14. The method according to claim 10, wherein the first signal and the second signal are both video signals.

15. A test equipment, comprising:
a display screen;
a driving circuit, configured to drive the display screen; and
a signal adjusting device, comprising: a level controller, at least one level circuit, a comparison circuit, and a selecting circuit;
wherein the at least one level circuit is electrically connected with the selecting circuit;
the level controller is electrically connected with the comparison circuit through the at least one level circuit, and is configured to perform a level adjustment to a first signal, so as to generate at least one level signal, and the generated at least one level signal is outputted by the at least one level circuit;
the comparison circuit is electrically connected to the selecting circuit, and is configured to:
compare the at least one level signal with a preset reference signal to obtain a comparison result; and
generate and output a corresponding feedback signal to the selecting circuit, based on the comparison result;

the selecting circuit is configured to output, as an adjusted signal, the level signal corresponding to the feedback signal, the selecting circuit comprises a switch controller and a switch circuit;

the at least one level circuit is electrically connected with the switch circuit;

the comparison circuit is electrically connected with the switch controller, and is configured to output the feedback signal to the switch controller; and the switch controller is electrically connected to the switch circuit, and is configured to turn on the switch circuit corresponding to the feedback signal, so as to output, as the adjusted signal, the level signal corresponding to the feedback signal;

the comparison circuit comprises a first comparator and a second comparator, the first comparator is electrically connected with the at least one level circuit; the first comparator is electrically connected with the second comparator the second comparator is electrically connected with the switch controller, the first comparator is configured to:

determine a primary difference between the level signal and the preset reference signal;

determine the primary difference is greater than the first preset threshold; and output, as a primary feedback signal, the level signal corresponding to the primary difference, in response to determining that the primary difference is greater than the first preset threshold, and the second comparator is configured to:

determine a secondary difference between a second signal and the primary feedback signal; and generate and output the corresponding feedback signal to the switch controller, based on the secondary difference;

the signal adjusting device is configured to acquire the first signal from the driving circuit, and to output the adjusted signal to the display screen, and the first signal is sampled from a signal output port of the driving circuit.

* * * * *